(12) United States Patent
Constien

(10) Patent No.: US 7,360,593 B2
(45) Date of Patent: *Apr. 22, 2008

(54) PRODUCT FOR COATING WELLBORE SCREENS

(76) Inventor: Vernon George Constien, 5311 E. 116 St. North, Sperry, OK (US) 74073

( * ) Notice: Subject to any disclaimer, the term of this patent is extended or adjusted under 35 U.S.C. 154(b) by 387 days.

This patent is subject to a terminal disclaimer.

(21) Appl. No.: 10/979,308

(22) Filed: Nov. 2, 2004

(65) Prior Publication Data

US 2005/0065037 A1 Mar. 24, 2005

Related U.S. Application Data

(60) Continuation-in-part of application No. 10/062,096, filed on Jan. 31, 2002, now Pat. No. 6,831,044, which is a division of application No. 09/627,145, filed on Jul. 27, 2000, now Pat. No. 6,394,185.

(51) Int. Cl.
*E21B 43/08* (2006.01)
*C09K 8/00* (2006.01)
*C09D 5/00* (2006.01)

(52) U.S. Cl. ............. 166/227; 166/376; 507/201; 507/219; 507/241; 507/265; 507/266; 507/267; 507/902

(58) Field of Classification Search ............. None
See application file for complete search history.

(56) References Cited

U.S. PATENT DOCUMENTS

| | | | |
|---|---|---|---|
| 3,768,563 A | 10/1973 | Blount | |
| 3,880,233 A * | 4/1975 | Muecke et al. ............. | 166/205 |
| 3,905,423 A * | 9/1975 | Sparlin et al. ............. | 166/296 |
| 4,202,411 A | 5/1980 | Sharp et al. | |
| 4,202,795 A | 5/1980 | Burnham et al. | |
| 4,335,788 A | 6/1982 | Murphey et al. | |
| 4,919,209 A | 4/1990 | King | |
| 4,986,353 A | 1/1991 | Clark et al. | |
| 5,062,484 A | 11/1991 | Schroeder, Jr. et al. | |
| 5,126,051 A | 6/1992 | Shell et al. | |
| 5,165,476 A | 11/1992 | Jones | |
| 5,247,995 A | 9/1993 | Tjon-Joe-Pin et al. | |
| 5,310,000 A | 5/1994 | Arterbury et al. | |
| 5,320,178 A | 6/1994 | Cornette | |
| 5,437,331 A | 8/1995 | Gupta et al. | |
| 5,624,886 A | 4/1997 | Dawson et al. | |
| 5,681,382 A | 10/1997 | Kokubo | |
| 5,709,269 A | 1/1998 | Head | |
| 5,911,923 A * | 6/1999 | Work et al. ............. | 264/4.7 |
| 5,964,291 A | 10/1999 | Bourne et al. | |
| 6,162,766 A | 12/2000 | Muir et al. | |
| 6,184,184 B1 | 2/2001 | Amin et al. | |
| 6,187,720 B1 | 2/2001 | Acker et al. | |
| 6,207,620 B1 | 3/2001 | Gonzalez et al. | |
| 6,235,393 B1 | 5/2001 | Kimura et al. | |
| 6,279,656 B1 | 8/2001 | Sinclair et al. | |
| 6,326,335 B1 | 12/2001 | Kowalski et al. | |
| 6,357,527 B1 | 3/2002 | Norman et al. | |
| 6,394,185 B1 | 5/2002 | Constien | |
| 6,673,403 B1 | 1/2004 | Shiiki et al. | |
| 6,818,594 B1 | 11/2004 | Freeman et al. | |
| 6,831,044 B2 * | 12/2004 | Constien ............. | 507/201 |
| 2002/0106625 A1 * | 8/2002 | Hung et al. ............. | 435/1.1 |

OTHER PUBLICATIONS

Select Industries, Inc., Information from website http://www.selectindustries.com, no date.

* cited by examiner

*Primary Examiner*—David Buttner
(74) *Attorney, Agent, or Firm*—Molly D. McKay

(57) ABSTRACT

Coatings for well screens that protect the screens from damage as they are inserted into the wellbore and once in the well, release reactive materials to react with and degrade potentially plugging materials such as drill solids, fluid filtercakes, fluid loss additives, and drilling fluids. The coatings can be specifically designed for individual well conditions and are comprised of a binder that either melts or dissolves within the wellbore and one or more reactive materials such as acids, enzymes, surfactants, chelants, oxidizers or free radical generators and the like which are released into the screen and the near wellbore area and which are effective in degrading or dissolving materials which could potentially plug the screen.

15 Claims, 3 Drawing Sheets

PRODUCT FOR COATING WELLBORE SCREENS

CROSS-REFERENCE TO RELATED APPLICATIONS

This is a continuation in part application of U.S. patent application Ser. No. 10/062,096 entitled "Product for Coating Wellbore Screens" filed on Jan. 31, 2002 now U.S. Pat. No. 6,831,044 which was a divisional application of U.S. patent application Ser. No. 09/627,145 entitled "Product and Process for Coating Wellbore Screens" that was filed on Jul. 27, 2000 now U.S. Pat. No. 6,392,185.

BACKGROUND OF THE INVENTION

1. Field of the Invention

The present invention relates to compositions for preventing flow capacity damage to wellbore screens and slotted liners. More specifically, the present invention relates to a coating that is applied to wellbore screens or slotted liners prior to insertion of the screens or slotted liners into the wellbore. The coating is comprised of reactive materials mixed with a binder. The coating protects the screens and slotted liners during insertion into the wellbore.

Also, after the screens and slotted liners have been placed in the well, the coating dissolves or melts off of the screens or slotted liners and the reactive materials within the coating react with the wellbore fluids and remaining drill-in fluid filtercake to degrade them, thus preventing the screens and slotted liners from becoming plugged with the fluids and filtercake and thereby allowing the well to achieve optimum production. The term "drill-in" is used herein to define the fluid used to drill into the producing interval of the well and may differ from the composition of the drilling fluid used in creating the rest of the wellbore.

2. Description of the Related Art

Several types of screens and liners are used in poorly consolidated formations to allow production of oil or gas. Fluids pass from the formation through the screens and up the tubing and out of the well. Unconsolidated formation materials bridge on the screen material or external gravel pack and are prevented from passing into the tubing.

The production of the well is highly dependent on having the flow paths in the screen or liner remain open, thus allowing the well to produce at its designed rate. However, often the screen will become plugged with bridging agents, polymers, and drill solids that are left in the wellbore at the completion of the drilling operation. The screen or liner may become plugged during placement of the screen as it is being pushed through remaining drilling mud or may become plugged once it is in place when the formation and remaining filtercake collapse or are carried with the produced fluids or gas onto the screen. This is particularly a problem in high angle or horizontal wellbores where it is very difficult to successfully circulate cleaning treatments such as acids or enzymes around the screen to remove remaining drilling fluid filtercake prior to beginning production.

As a result, when production begins, the remaining drilling fluid filtercake may be carried into the screen along with the reservoir liquids or gas and can plug or restrict production from large areas of the screen.

Various blends of waxes and mixtures of wax and polymers have been used in the past to coat the screen or liner in order to protect the flow channels of the screen or liner while the screen or liner is being placed into the wellbore. See U.S. Pat. Nos. 3,880,233 and 3,905,423 for examples of wax coatings that might be suitable for such use. These waxes generally were designed to melt at the wellbore temperature to restore the flow capacity of the screen. Also, some of these coating materials were also soluble in crude oil. Other temporary coating materials have been used for this purpose, including meltable or dissolvable fiber-reinforced wax, an active metal which may be dissolved by acid or caustic solution, salts, asphaltenes that are dissolvable in crude oil, and eutectic compounds formed by combining organic compounds. U.S. Pat. No. 5,320,178 teaches a fiber-reinforced plug. U.S. Pat. No. 5,310,000 teaches an active metal wrapped base pipe. U.S. Pat. No. 5,165,476 provides examples of compounds that might be used as temporary coating materials. U.S. Pat. No. 4,202,411 provides an example of an acid soluble coating.

Until now, none of these coating materials have been designed to also include materials which can be released after the screen or slotted liner is in place and react with or solubilize plugging materials that may be in the wellbore.

The present invention addresses this need in that it uses a coating binder, such as solid surfactants, waxes, blends and the like, in which to incorporate reactive materials, such as enzymes, chelants, organic acids, surface active agents, oxidizers and other reactive materials which are capable of dissolving, degrading, or dispersing potentially plugging materials, such as for example materials commonly found in drilling fluids, filtercakes formed from these drilling fluids, hydraulic fracturing fluids, and high viscosity completion fluid "pills".

One object of this invention is to provide a coating on the screen or liner that serves to prevent damage to the screen or liner while the screen or liner is being inserted into the wellbore.

A further object of this invention is to release the coating from the screen or liner at a controlled rate.

Another object of this invention is that the coatings can be customized for the particular well environment and can also be designed so that the coating is released from the screens or liners sequentially. For example, the coating may be varied along the length of a well so that the coating on the distal end of the string of screen is released from the screen prior to release of the coating on the proximal end of the string of screen.

Still a further object of this invention is to release reactive materials from the coating that will react with and dissolve or disperse materials that are commonly found in drilling fluids or in the filtercakes formed from these fluids.

Another object of the present invention is to release reactive materials into the wellbore that serve to degrade high viscosity completion fluid "pills" which have been placed into the wellbore to control fluid loss during a completion.

Still another object of the present invention is to degrade fluids used to place external gravel packs around the screen, i.e. gravel pack carrying fluids.

A further object of the present invention is to release reactive materials into the wellbore that serve to degrade hydraulic fracturing fluids that have been used in a "frac and pack" application where slurries of fracturing fluid and particles have been pumped into the formation and pumped between the screen and the wellbore casing to pack the annulus.

Another benefit of this invention is that it may eliminate the need for a wash pipe to be placed inside the screen in order to pump fluids down to the end of the screen and circulate the wellbore. If a wash pipe is not employed, the binding agent for the coating will be selected in such a way as to remain in place until the pumping process is completed.

SUMMARY OF THE INVENTION

The present invention is a product and process for coating wellbore screens and liners. The coating of the present invention serves to prevent flow capacity damage to sand control screens or slotted liners as the screens or liners are placed into the wellbore and then melts or dissolves and releases materials which react with potential screen plugging materials and thus minimizes flow capacity damage to the screen or liner. The coating of the present invention is composed of a binding agent and one or more reactive materials or components, such as enzymes, chelants, organic acids, surface active agents, oxidizers and other materials which are capable of dissolving, degrading, or dispersing potentially plugging materials, such as for example materials commonly found in drilling fluids, filtercakes formed from these drilling fluids, hydraulic fracturing fluids, high viscosity completion fluid "pills", and gravel packing fluids.

Once the screen or liner has been placed across the production interval of the well, the coating is released from the screen or liner, either by melting or dissolving the binder of the coating. The rate of release can be controlled by proper selection of binder, i.e. selection of a binder with a melting point that matches the wellbore temperature within the well or selection of a binder that dissolves in the drilling fluid employed in the well.

When released from the coating that covers the screen or liner, the reactive components disperse, degrade or dissolve potentially plugging materials in the near wellbore area and minimize plugging to the screen or slotted liner.

The exact composition of the binding agent and the reactive materials to be used in the present invention are selected based on the type of drilling, completion, gravel pack, or fracturing fluid in the wellbore. The binder is generally selected based on two criteria: bottom hole temperature of the well and the type of drilling mud employed in the well. The reactive ingredients are selected based on various factors, including but not limited to, compatibility with the binder, compatibility with the other reactive ingredients, and reactivity with the drilling fluid and with possible drill solids that may be present in the wellbore.

The composition of the binding agent and reactive agents within the coating and the placement of the coating on the screen assembly, slotted liner, or associated pipe can also be altered depending on whether the well will be gravel packed around the screen once the screen is in place.

The coating can be applied to the screen or slotted liner and associated tubing in various ways. In one method of application, a screen and protective shroud are fully impregnated with the coating.

Another method of application involves internally coating or filling with the coating some portion of the basepipe on which the screen material is secured, in addition to filling the screen material and an external erosion shroud that may be provided surrounding the screen material. This method of application of the coating results in higher levels of reactive materials being placed into the wellbore. After the binding agents melt or dissolve to release the reactive materials, the reactive materials can diffuse throughout the wellbore before production is initiated, or an overbalance pressure can be applied to the inside of the basepipe to force the reactive materials through the screen or liner and into contact with the potentially plugging materials, i.e. the residual drilling fluids or filtercakes.

Another method of application that results in still higher levels of reactive agents being placed into the wellbore is to apply the coating to blank segments of basepipe that are located between the screen segments within the well. The coating is placed on the blank pipe until the diameter of the blank pipe is approximately the same as the diameter of the screen and shroud sections. A suitable cage or basket may optionally be placed on the blank pipe in order to give mechanical support to the chemical composition comprising the coating.

Still another method of application involves coating and filling wire-wrapped screens that contain internal gravel-prepacks. The reactive materials released from the coating on the screen can be designed to degrade remaining gravel pack viscosifying polymers such as hydroxyethyl cellulose or xanthan.

DETAILED DESCRIPTION OF THE PREFERRED EMBODIMENT THE INVENTION

Figure 1:
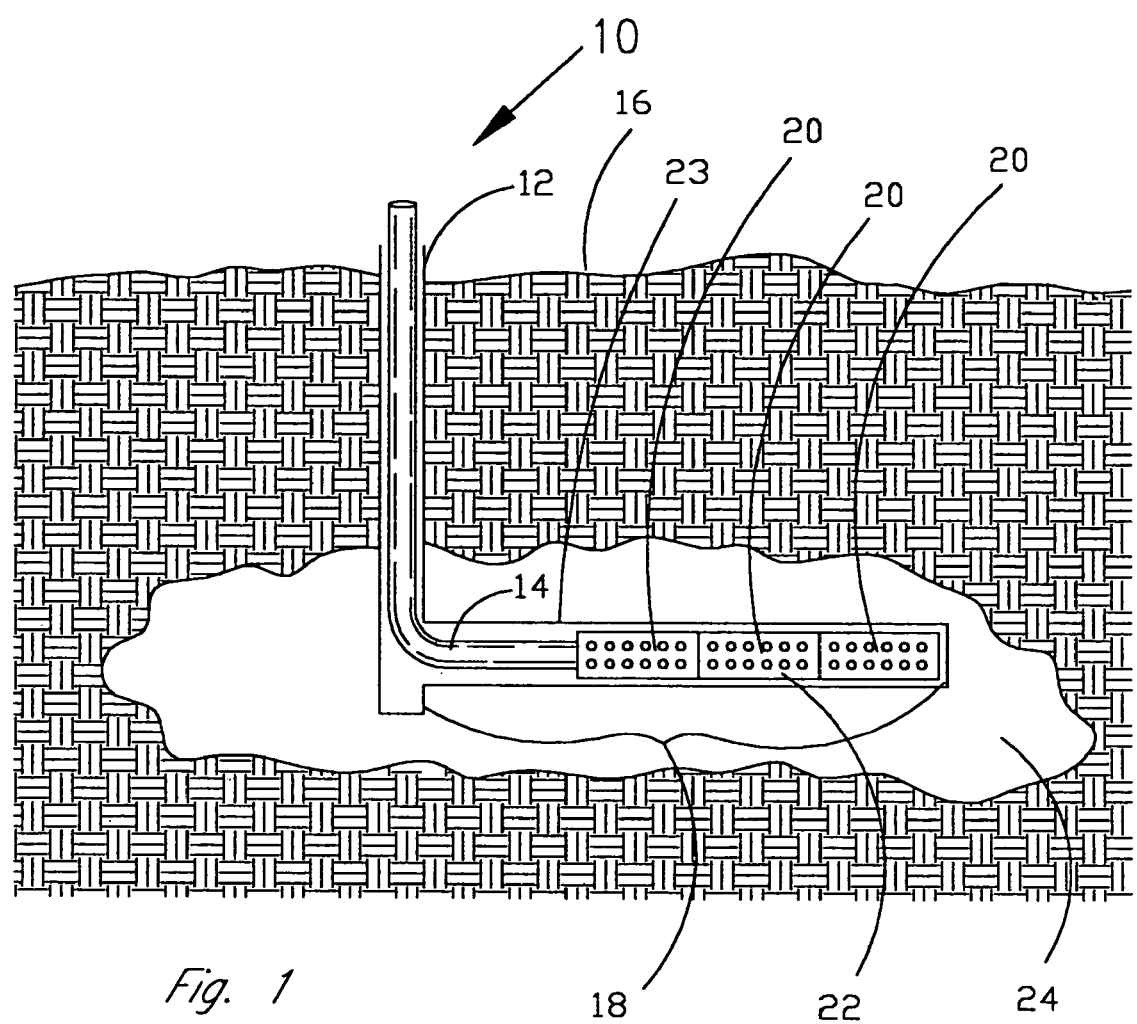
FIG. 1 is a well employing a string of continuous screen that has been coated in accordance with a preferred embodiment of the present invention.

Referring now to FIG. 1, there is illustrated an oil or gas well 10 with a horizontal portion 18. The well 10 is shown with a well casing 12 and production tubing 14 that is located inside the casing 12 and extends from the ground surface 16 downward into the well 10. As illustrated in FIG. 1, the horizontal portion 18 of the completed well 10 contains a plurality of screen segments 20 that are connected together to form a continuous screen 22 that may extend horizontally for over one thousand feet in a wellbore 23 created in the formation 24.

The present invention is a product and process for coating these types of wellbore screens 20. Although the invention is shown in the illustrations in association with screens 20 for a horizontally completed well 10, the invention is not so limited and may be used in association with any type of well. Also, the invention is described hereafter for use in association with screens 20, but the invention is not so limited and may be used with slotted liners, blank pipe, etc.

Figure 2:
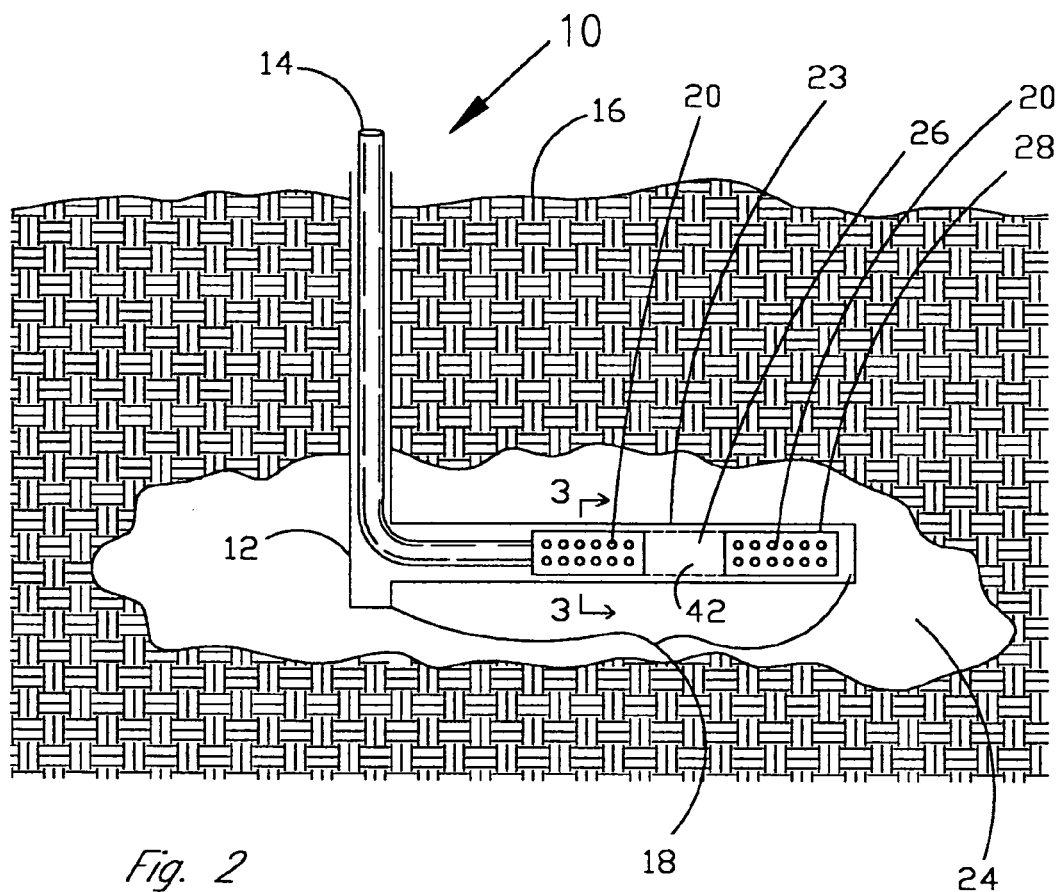
FIG. 2 is a well employing a string of non-continuous screen comprised of screen segments and blank pipe segments, both of which have been coated in accordance with a preferred embodiment of the present invention.

Referring now to FIG. 2, there is illustrated the same well 10 as depicted in FIG. 1 but with the continuous screen 22 having been replaced by a set of screens 20 that are spaced apart from each other by blank pipe segments 26. The blank pipe segments 26 connect to and between the screen segments 20, separating the screen segments 20 from each other. Together, the blank pipe segments 26 and the screen segments 20 form a non-continuous screen 28 as an alternate to the continuous screen 22 that is illustrated in FIG. 1. For clarity the invention will hereafter be discussed in detail in relationship to screens or screen segments 20. However, the invention is not so limited and may be used in association with continuous screens 22, with non-continuous screens 28, or with other suitable structures.

The present invention is a product and process for coating wellbore screens 20 to prevent flow capacity damage to the screens 20 as the screens 20 are placed into the wellbore 23 and to release reactive materials from the coating once the screen 20 or slotted liner is in place to reduce or prevent plugging of the screen 20 or liner.

The coating of the present invention is composed of a binding agent and one or more reactive materials or components, such as enzymes, chelants, organic acids, surface active agents, oxidizers and other reactive materials which are capable of dissolving, degrading, or dispersing potentially plugging materials, such as for example materials commonly found in drilling fluids, filtercakes formed from these drilling fluids, hydraulic fracturing fluids, and high viscosity completion fluid "pills".

Once the screen 20 or liner has been placed in the production interval of the well 10, the coating is released from the screen 20 or liner, either by melting or dissolving the binder of the coating. The rate of release can be controlled by proper selection of binder, i.e. selection of a binder with a melting point that matches the wellbore temperature within the well 10 or selection of a binder that dissolves at a controlled rate in the fluids in the well 10.

With the release of the coating from the screen or liner, the reactive components separate from the binding agent and react with potentially plugging materials in the near wellbore area. By dispersing, degrading or dissolving potentially plugging materials in the near wellbore area, the reactive components prevent the screen 20 or liner from becoming plugged with these materials.

The exact composition of the binding agent and the reactive materials to be used in the present invention are selected based on the type of drilling, completion, gravel pack, or fracturing fluid in the wellbore 23 and the type of formation, the drilling solids which may be present, and the expected wellbore temperature during placement of the screen 20.

High melting point surfactants, waxes, and blends of these elements have been found to make good binders. Several useful compositions for binders are described in U.S. Pat. Nos. 3,768,563; 3,880,233; 3,905,423; 5,165,476; and 5,320,178. Inorganic materials such as sodium silicate have also been used as binders in other applications such as for making pellets containing oxidizers and chelants. Inorganic binders might be useful in certain well conditions.

Selection of Binder

It is sometime possible for a binder to also serve other functions, such as also being a surfactant or being a source of acid. An example of a binder, which is useful in applications below about 150 degrees Fahrenheit bottom hole static temperature, is the nonionic surfactant Igepal DM970FLK. This material is effective in making a stable coating capable of containing reactive materials, but also lowers the surface tension when it dissolves. For higher temperature applications, it may be desirable to use a material such as a high melting point organic acid like polyglycolic as the binder. Glutaric acid has been found useful in the present invention as a binder material in the place of high melting point surfactants in creating mid-temperature range formulations. Not only does glutaric acid function as a binding material, it is also capable of reacting with and dissolving calcium carbonate, thereby providing more reactive capability in the formation.

Selection of Reactive Materials

The reactive materials are selected based on various factors, including but not limited to, compatibility with the binder, compatibility with the other reactive ingredients, compatibility with the drilling fluid, the types of potentially plugging materials that are expected to be present in the wellbore 23, and the expected wellbore temperature. These reactive materials may include enzymes, chelants, acids, surfactants, oxidizers or free radical generators, corrosion inhibitors, scale or paraffin inhibitors or other specific chemicals as called for by a particular well condition. Some of these possible reactive materials will be discussed hereafter.

Enzymes

Enzymes are useful materials for degrading polysaccharide materials commonly found in water-based drilling or completion fluids. The enzymes can attack specific chemical linkages in the molecules and degrade the polymers into smaller fragments that do not plug the flow channels in the screen 20 or the porosity in the formation 24 near the wellbore 23.

Enzymes may be selected based on the type of water-soluble polymer used in the drilling fluid or completion fluid. Suitable enzymes for this purpose include mannanase, hemicellulase, amylase and the like. Other examples are listed in U.S. Pat. Nos. 5,247,995 and 5,126,051 and include glucosidase, endoxylanse, exo-xylanase, and the like. The preferred physical state of the enzymes for use in the coating is as solids or liquid enzymes that have been adsorbed onto treated supports.

Chelants

Filtercakes on the wellbore often contain bridging particles from the drilling mud such as calcium carbonate particles, and small particles of the formation 24 that have been formed during the drilling process. These particles can be particularly damaging to flow channels in screens 20 and pore spaces in the near wellbore formation 24. Chelants can be used to dissolve these particles. Several chelants can be used, and their selection is based on such considerations such as the other types of materials in the formulation. For example, if enzymes are also in the mix, an acid form of the chelant may be used to achieve the desired pH once the reactive materials have been released from the binder. Common chelants include the acid or the partially or fully neutralized form of ethylenediaminetetraacetic acid, nitrilotriacetic acid, citric acid and the like. The preferred physical state of the chelants for use in the coating is as solids so that they may be easily incorporated into the binding agent. In some cases, chelants that are normally liquids can be converted into solids for this purpose. For example, triethanolamine can be reacted with hydrochloric acid to form a solid salt, which can be incorporated into the binder.

Acids

Several organic acids are useful in degrading the polysaccharides commonly found in drilling or completion fluids. In addition, organic acids also dissolve materials such as calcium carbonate. Preferred acids for inclusion in the coating include sulfamic, benzoic, citric, fumeric, polyglycolic acids, and combinations of organic acids with ammonium bifluoride, and the like. The preferred acids are solids at standard conditions or are liquids that have been adsorbed onto a support material or have been encapsulated. Additionally, materials such as esters, which hydrolyze under downhole conditions to form acids, can be used as an acid in the coating. An example is glycolic acid that is formed when polyglycolic acid hydrolyzes.

Another useful method of creating strong acids within the wellbore 23 from the reactive materials is to use a blend of organic acids with a hydrogen fluoride salt such as ammonium bifluoride. A solid organic acid can be blended in a binder with a material such as sodium or ammonium bifluoride. When the binding agent releases the reactive materials and they dissolve, hydrofluoric acid is produced. Hydrofluoric acid is very effective in hydrolyzing polysaccharide materials or dissolving materials such as clay particles.

Surfactants

Surfactants lower the surface and interfacial tension of solutions. Surfactants are also useful in dispersing fragments of polymers and inorganic particles into small colloids, which can then pass through pore spaces and flow channels. Additionally, they are useful in improving the flow from wellbores 23. They may also be foaming agents that can foam gases and liquids in the wellbore being produced from the formation 24 so that the hydrostatic head in the production tubing 14 is reduced and the well 10 can produce at higher rates. Some surfactants can be used as the binding agents and serve a dual purpose in the coating.

Other examples of useful surfactant compositions include those sold as SLICK STICKS and FOAM STICKS by Select Industries, Inc. located at P.O. Box 2450, Wichita Falls, Tex. 76307.

Oxidizers or Free Radical Generators

It is also possible to incorporate reactive materials in the coating that can degrade the polymeric materials by oxidation or by reacting with dissolved oxygen in the water in the wellbore 23 to produce free radical species that can degrade potentially plugging materials such as xanthan polymer. Examples of free radical generators include ascorbic acid or erythorbic acid. Oxidizers include sodium, ammonium, potassium, calcium, zinc, or magnesium peroxide. U.S. Pat. No. 5,624,886 issued to Dawson et al. specifically teaches use of calcium peroxide and magnesium peroxide.

Other Additives

The current invention includes the ability to deliver other chemical additives to a precise location in the wellbore 23. It is envisioned that other useful reactive materials may be delivered in this manner. The useful materials could be classes of materials such as corrosion inhibitors, scale or paraffin inhibitors, or other specific chemicals as called for by a particular well condition.

Creating and Testing the Coating Blend

The following examples are presented to show the utility of the invention and are not intended to limit the invention in any way. The examples that follow illustrate the following two steps that must be accomplished to develop a specific coating for a particular well application according to the present invention:

1. selecting the coating composition and initial evaluation for coating properties, and
2. testing the coating composition to verify that it can degrade drilling fluid filtercakes.

1. Selecting the Coating Composition and Initial Evaluation for Coating Properties:

The first step in the process of selecting a composition to fill and coat the porous flow channels of screens 20 or slotted liners is to select possible binding and active agents and evaluate the properties of the resulting solid coating.

Tests for Binder/Active Materials Formulation:

The object of this test is to determine what materials are compatible and the ratios of materials that can be formulated together to produce a potting material of sufficient strength to be able to be useful in filling and coating screen assemblies or slotted liners.

Procedure:

The binding agent is melted and blended with the active materials. The resulting formulation is cast into test molds. The appearance of the formulation is then observed. Three charts are provided below. The first two charts show examples of several formulations and include observations on the appearance of each formulation. The first chart includes examples of simple formulations, the second chart includes examples of more complex formulations, and the third chart provides example of changes to formulations that can be made to control the melting point of the binding agent.

Examples of Simple Formulations.

| Test No. | Binder | grams | Active material | grams | Comments on appearance |
|---|---|---|---|---|---|
| 1 | Paraffin* | 2 | Polyglycolic acid | 6 | dry/crumbly |
| 2 | Paraffin | 6 | Polyglycolic acid | 2 | Freeflowing, smooth coating |
| 3 | Paraffin | 3 | Polyglycolic acid | 1.5 | Free flowing, smooth coating |
|   |   |   | Fumaric acid | 1.5 |   |
| 4 | Igepal DM970FLK | 2 | EDTA | 2 | Smooth coating |

*melting point = 150° F.

Examples of More Complex Formulations.

| Test No. | Binder (gm) | Enzymes (gm) | | | Chelant (gm) | Organic Acids (gm) | | Comment |
|---|---|---|---|---|---|---|---|---|
|   |   | Validase - X | Enzeco FG | Enzeco Exsize ASE-P | EDTA | Fumaric acid | Sulfamic acid |   |
| 5 | Igepal DM FLK |   |   |   |   |   |   |   |
| 6 | 2.5 |   |   |   | 2.5 |   |   | crumbly |
| 7 | 2.5 |   | 2.5 |   |   |   |   | crumbly |
| 8 | 2.5 | 2.5 |   |   |   |   |   | smooth coating |

-continued

| Test No. | Binder (gm) | Enzymes (gm) | Chelant (gm) | Organic Acids (gm) | Comment |
|---|---|---|---|---|---|
| 9 | 2.5 | | 2.0 | .5 | smooth coating |
| 10 | 2.5 | 2.0 | | .5 | smooth coating |
| 11 | 2.5 | | | 2.5 | smooth coating |
| 12 | 2.5 | 2.0 | | .5 | smooth coating |
| 13 | 2.5 | | | 2.5 | smooth coating |
| 14 | 2.5 | | 2.5 | | smooth coating |
| 15 | 2.0 | | 2.0 | | smooth coating |
| 16 | 2.0 | | 2.5 | | smooth coating |
| 17 | 1.6 | | 2.4 | | Does not mix well, balls up. |

Examples of Formulation Changes to Control the Melting Point of the Binding Agent.

Blends of Surfactants and Paraffin

| % by weight | | Melting |
|---|---|---|
| NP-500 | Paraffin | Point ° F. |
| 0 | 100 | 150 |
| 50 | 50 | 112 |
| 20 | 80 | 125 |
| 100 | 0 | 99 |

2. Testing the Coating Composition to Verify that it can Degrade Drilling Fluid Filtercakes.

A laboratory test method was developed in order to evaluate the effectiveness of coated screens to remove filtercakes that had been formed from water-based drilling fluids.

This test indicates whether the active materials in the coated screen are effective in attacking drilling fluid filtercakes. These filtercakes could damage the flow capacity of the well if not degraded.

Filtercake Degradation Test Procedure:
1. Preparing a coated screen containing cleanup additives.
2. Preparing a drilling fluid filtercake by forcing a drilling fluid against a porous filter media.
3. Suspending the coated screen 1 in. above the filtercake in a test cell containing a brine solution.
4. Applying a differential pressure across the filter media and filtercake and heating the test cell.
5. Monitoring the time and rate of fluid flow through the filtercake as the reactive materials in the coated screen are released and attack the filtercake.
6. Measuring the final permeability of the porous material and comparing it to the original value.

Preparing Coated Screens:

In these examples, flat samples of 8-gauge wire-wrapped screens, approximately 2 inches in diameter were used. Other types of screens could have alternately been used.

1. Record the initial screen weight.
2. Heat the binding material to its melting point.
3. Add reactive materials and mix until uniform.
4. Apply the molten slurry to the screen and form a uniform coating.
5. Record the final screen weights with the coating.

Test Procedure for Removal of Drilling Fluid Filtercake:
1. Soak 5-micron ceramic disk under vacuum.
2. Pre-heat the heating jacket to the testing temperature.
3. Place disk into a 500 ml high temperature, high pressure fluid loss (HTHP) cell.
4. Flow deionized (DI) water through the ceramic disk at 5 psi in the production direction.
5. Record the rate of flow when a constant rate is reached.
6. Record time to flow 200 ml of DI water through the disk. This represents the initial production permeability.
7. Remove the top cap and pour out the fluid from the cell.
8. Fill the cell with a water-based drill-in fluid (150 ml).
9. Place the top on the cell and place the cell in the heating jacket with disk on the bottom and the valve below the disk in the closed position.
10. Place 300 psi of nitrogen on the top of the fluid.
11. Let the cell stand for 30 minutes to bring the fluid up to specified test temperature.
12. Open the bottom valve to place a differential pressure across the disk.
13. Record the leakoff rate as the drilling fluid filtercake is formed on the ceramic disc.
14. After 4 hours close the leakoff valve, cool and release the pressure from the cell.
15. Remove the top cap and pour off mud.
16. Place 300 ml of 2% KCl onto the cake gently with bottom valves in the closed position.
17. Attach the coated screen to a section of ¼ inch tubing connected to the underside of the top cell cap.
18. Lower coated screen into cell to approximately 1 in. above the filtercake and fasten top cap to the HTHP cell.
19. Apply 300 psi of nitrogen pressure.
20. Open bottom valve and monitor leakoff as a function of time. Shut off leakoff when 100 ml passes through the disc or when total leakoff time reaches 16 hr, whichever occurs first.

21. Open the cell and remove the screen. Replace the top cap.
22. Flow DI water through disk at 5 psi in the production direction.
23. Determine the time to flow 200 ml. in the production direction.
24. Calculate % return permeability in the production direction =return flow time from Step 23 to 200 ml/initial flow time to 200 ml from Step 6×100.

Detailed Example of a Filtercake Degradation Test

Figure 4:
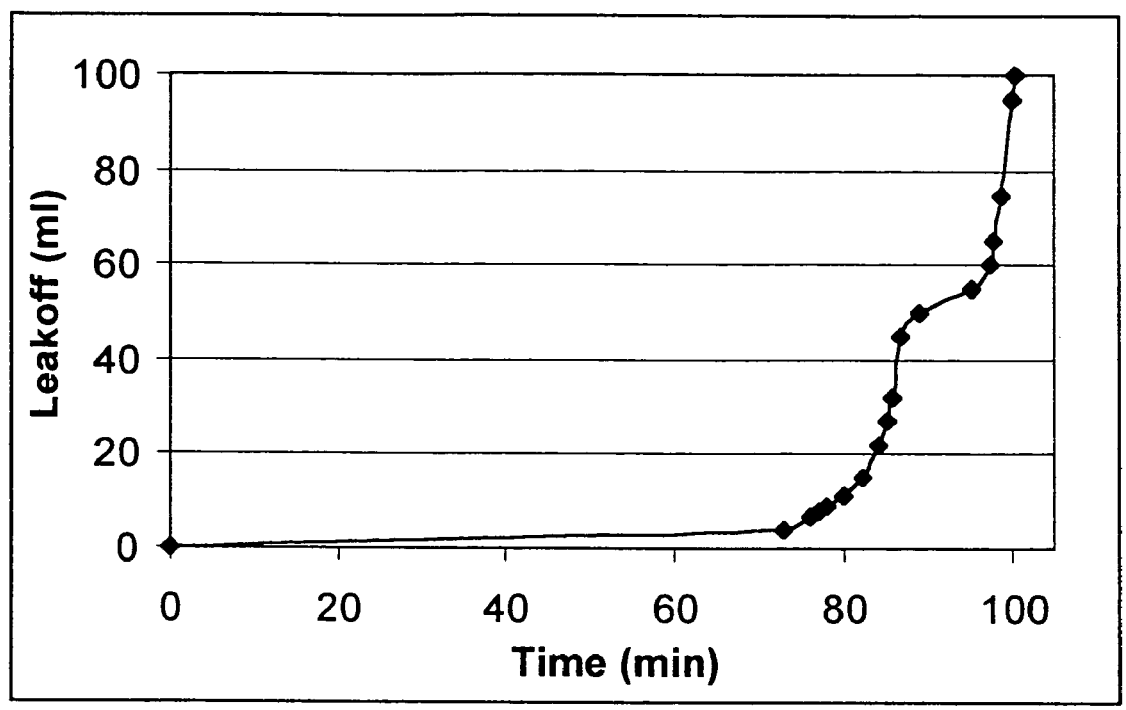
FIG. 4 is a graph illustrating the change in fluid loss control for a filtercake that has come into contact with reactive materials which have been released from a coating on a screen.

This test was run according to the procedure given above. The drill-in fluid was a water-based fluid containing sized calcium carbonate particles, starch, xanthan gum, and bactericide and was designed to control mud leakoff rate and to be stable at the test conditions. The drill-in fluid was placed into the test cell, heated to the specified test temperature, i.e. 150 degrees Fahrenheit in this test run, and a 300-psi differential placed across the ceramic disc to allow leakoff to occur for 4 hours. A total of 22 ml of filtrate from the drilling fluid passed through the ceramic disc. The remaining drilling fluid was then removed from the cell and 300 ml of 2% potassium chloride solution placed into the cell. The coated screen was then lowered into the cell approximately 1 inch above the drilling fluid filtercake. The cell was allowed to return to the specified test temperature and the 300-psi differential pressure across the filtercake and ceramic disc applied. FIG. 4 is a chart that illustrates the leakoff through the filtercake and disc. The coating on the screen was designed to release at the test temperature. The leakoff curve illustrates that the active materials from the coating were released and began to degrade the mud filtercake. After about 80 min., the filtercake was penetrated and flow began to rapidly increase through the ceramic disc. The flow through the disc was halted after 100 ml. and the cell shut-in for the remained of the 16 hours of soak time. The retained permeability of the ceramic disc was then determined in the production direction and was 94%.

In the test described above, an 8-gauge wire-wrapped screen was coated with the composition shown below.

Igepal 6.0 g  
EDTA 3.0 g  
HEDTA 0.6 g  
Ascorbic Acid 1.0 g  
Enzymes (Enzeco ASE-P 0.7 g and Enzeco FG 0.7 g)

Initial Screen Wt. (g) = 44.66  
Coated Wt. (g) = 54.98  
Final Wt. (g) at end of test = 44.9

Several additional tests were completed testing variations in the screen coating composition. The results of those tests are recorded in the following table.

Summary of Filtercake Removal Test Results

| Test No. | Coating Composition applied to the screen | | | | | Leakoff pH | Return Perm Product |
| --- | --- | --- | --- | --- | --- | --- | --- |
| | Igepal 970 (g) | EDTA (g) | HEDTA (g) | Ascorbic Acid (g) | Enzyme (g) | | |
| 18 | 6.0 | 3.2 | 1.6 | 1.2 | | 5.06 | 10% |
| 19 | 6.0 | 2.4 | 1.2 | 1.2 | FG 1.2 | 4.63 | 21.8% |
| 20 | 6.0 | 1.8 | 1.8 | 1.2 | FG 1.2 | 4.24 | 90.5% |
| 21 | 6.0 | 3.0 | 0.6 | 1.2 | ASE 1.2 | 6.37 | 30.2% |
| 22 | 6.0 | 1.8 | 1.8 | 1.2 | Mannase 1.2 | 4.24 | 74% |
| 23 | 6.0 | 3.0 | 0.6 | 1.0 | ASE 1.0 Mannase 0.4 | 6.01 | 69.0% |
| 24 | "Blank" Test. No coating on screen | | | | | | <1% |
| 25 | 6.0 | 3.0 | 0.6 | 1.2 | ASE 1.2 | 5.95 | 36% |
| 26 | 6.0 | 3.0 | 0.6 | 1.0 | ASE 0.7 FG 0.7 | 4.4 | 94 |

ASE = Enzeco Exsize ASEP Enzyme  
FG = Enzeco FG enzyme

DEFINITIONS

The Following Tradenames/trademarks, Which Have Been Referred to Herein, are Given Along With Their Composition and Supplier.

| Material Trade Name/ Trademark | Composition | Supplier |
| --- | --- | --- |
| Validase X | hemicellulase | Valley Research, Inc South Bend, IN |
| Validase FAA 40 | I.U.B. 3.2.1.1 1.4-Alpha-D-glucan glucanohydrolase | Valley Research Inc South Bend IN |
| IGEPAL DM 970 FLK | ethoxylated dinonylphenol and nonylphenol, branched | Rhodia Cranbury NJ |
| EDTA/HEDTA | tetrasodium salt of ethylenediamine-tetraacetic acid or ethylenediamine tetraacetic acid | Dow Chemical Co. |
| Enzyme | Mannanase | ChemGen Corp Gaithersburg MD |
| NP-500 | alkylphenol ethoxylates | BASF |
| Xanvis | xanthan gum | Kelco Houston TX |

-continued

| Material Trade Name/ Trademark | Composition | Supplier |
|---|---|---|
| Enzeco Exsize-ASE P | alpha-amylase | EDC New York, NY |
| Enzeco FG | cellulolytic | EDC New York, NY |

Application of the Coating onto the Screen

The composition of the binding agent and reactive agents within the coating and the placement of the coating on the screen assembly 20, liner (not illustrated), or associated pipe 23 can also be altered depending on whether the well will be gravel packed around the screen 20 once it is in place.

Figure 3:
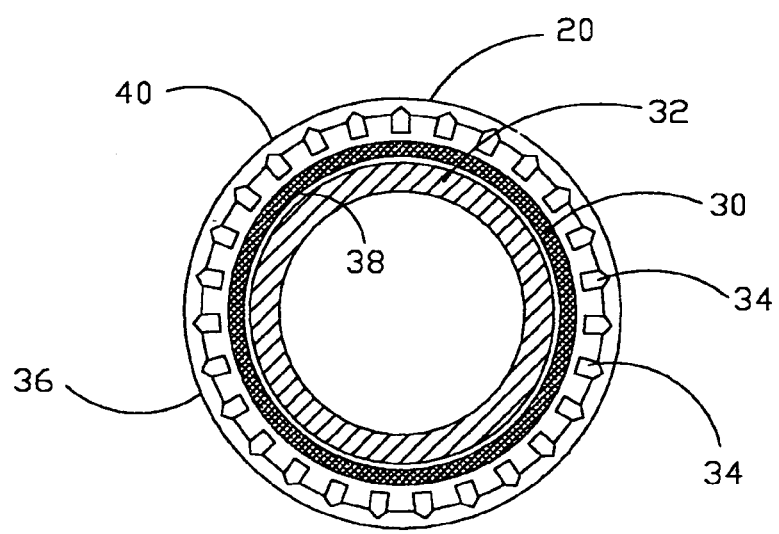
FIG. 3 is a cross sectional view of a wellbore screen taken along line 3-3 of FIG. 2, showing the structures of the screen that can be coated in accordance with the present invention.

The coating can be applied to the screen 20 or liner (not illustrated) and associated pipe 23 in various ways. In one method of application, coating is applied to and fully impregnates the screen 20 and its protective shroud. As illustrated in FIG. 3, the screen 20 includes a basepipe 30, stand offs 34, and wire 36. FIG. 3 also includes a washpipe 32 located internally to the basepipe 30. FIG. 3 illustrates a wire wrapped screen, however the present invention can also be employed with premium type screens that employ pressed or sintered metal instead of wire. The coating can be applied to all of the elements of the screen 20, the protective shroud surrounding the screen 20, and all of the openings existing between the screen 20, the stand offs 34, and the wire 36

Another method of application, involves internally coating or filling with the coating some portion of the perforated basepipe 30 on which the wire 36 that forms the screen material is secured, in addition to filling the openings of the screen material and possible external shroud. This method of application of the coating results in higher levels of reactive materials being placed into the wellbore 23. After the binder melts or dissolves to release the reactive materials, the reactive materials can diffuse throughout the wellbore 23 before production is initiated, or an overbalance pressure can be applied to the inside of the basepipe 30 to force the reactive materials through the screen 20 and into contact with the potentially plugging materials, i.e. the residual drilling fluids or filtercakes, etc.

Another method of application that results in still higher levels of reactive agents being placed into the wellbore 23 is to apply the coating to the blank pipe segments 26 that are located between the screen segments 20 within the well 10 for non-continuous screens 28. The blank pipe 26 is coated externally with the coating until the diameter of the blank pipe 26 is the same as the screen 20 and shroud sections. A suitable cage or basket (not illustrated) may optionally be placed on an exterior surface 42 of the blank pipe 26 in order to give mechanical support to the chemical composition comprising the coating.

Still another method of application of the coating is to use a screen 20 that has been filled with the coating in a gravel pack completion. In this completion, sized sand or other particulates are circulated or squeezed around the screen 20 until the annular area is packed. The reactive materials released from the coating on the screen 20 can be designed to degrade remaining gravel pack viscosifying polymers such as hydroxyethyl cellulose or xanthan.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A coating applied onto a wellbore screen comprising:
a chemical binder applied to a wellbore screen, at least one reactive material mixed with said chemical binder so that the reactive material is released from the binder when the wellbore screen is inserted into a wellbore, said reactive material being reactive toward potentially screen plugging materials and
said chemical binder being selected from one or more of the following materials: high melting point surfactants, high melting point waxes, high melt point organic acids, polymer blends, blends of high melting point surfactants and waxes, blends of surfactants and wax, and blends of surfactants and organic acids, blends of waxes and organic acids.

2. A coating applied onto a wellbore screen according to claim 1 wherein the chemical binder has a melting point between 120 degrees Fahrenheit to 275 degrees Fahrenheit.

3. A coating applied onto a wellbore screen according to claim 1 wherein at least one reactive material is a chemical capable of dissolving calcium carbonate.

4. A coating applied onto a wellbore screen according to claim 3 wherein at least one reactive material is selected from the following materials: chelants, organic acids, and combinations of organic acids with ammonium bifluoride.

5. A coating applied onto a wellbore screen according to claim 1 wherein at least one reactive material is capable of degrading polymers or starches.

6. A coating applied onto a wellbore screen according to claim 5 wherein said at least one reactive material is selected from the following materials: an organic acid, a combination of organic acids with ammonium bifluoride, an oxidizing agent, materials which can cause the production of free radicals, and an enzyme.

7. A coating applied onto a wellbore screen comprising:
a chemical binder applied to a wellbore screen, at least one reactive material mixed with said chemical binder so that the reactive material is released from the binder when the wellbore screen is inserted into a wellbore said reactive material being reactive toward potentially screen plugging materials, and
said chemical binder being selected from one or more of the following materials: a paraffin, an ethoxlylated dinonyphenol and nonyphenol branched nonionic surfactant, an alkyphenol ethoxylate, a blend of polyethylene and copolymer waxes, a blend of surfactant and wax, a blend of surfactant and organic acids, a blend of wax and organic acid, polyglycolic acid, and glutaric acid.

8. A coating applied onto a wellbore screen comprising:
a chemical binder applied to a wellbore screen, at least one reactive material mixed with said chemical binder so that the reactive material is released from the binder when the wellbore screen is inserted into a wellbore, and
at least one reactive material is selected from the following materials: disodium salt of ethylenediaminetetraacetic acid, dipotassium salt of ethylenediaminetetraacetic acid, diammonium salt of ethylenediaminetetraacetic acid, and tetrasodium salt of ethylenediaminetetraacetic acid.

9. A coating applied onto a wellbore screen comprising:

a chemical binder applied to a wellbore screen, at least one reactive material mixed with said chemical binder so that the reactive material is released from the binder when the wellbore screen is inserted into a wellbore, and at least one reactive material is selected from one or more of the following materials: ethylenediaminetetraacetic acid, glutaric acid, ascorbic acid, erythorbic acid, sulfamic acid, citric acid, fumaric acid, magnesium peroxide, and calcium peroxide.

10. A coating applied onto a wellbore screen comprising:

a chemical binder, at least one reactive material mixed with said chemical binder so that the reactive material is released from the binder when the binder and reactive material are inserted into a wellbore, and at least one reactive material is a polymeric form of glycolic acid which has a melting point between 120 degrees Fahrenheit and 250 degrees Fahrenheit.

11. A coating applied onto a wellbore screen comprising:

a chemical binder applied to a wellbore screen, at least one reactive material mixed with said chemical binder so that the reactive material is released from the binder when the wellbore screen is inserted into a wellbore, and at least one reactive material is selected from one or more of the following materials: sodium persulfate, ammonium persulfate, and potassium persulfate.

12. A coating for application onto a wellbore screen comprising:

a chemical binder applied to a wellbore screen, at least one reactive material mixed with said chemical binder so that the reactive material is released from the binder when the binder and reactive material are inserted into a wellbore, and at least one reactive material is an organic acid with a melting point between 120 degrees Fahrenheit to 275 degrees Fahrenheit in combination with ammonium bifluoride.

13. A coating for application onto a wellbore screen comprising:

a chemical binder, at least one reactive material mixed with said chemical binder so that the reactive material is released from the binder when the binder and reactive material are inserted into a wellbore, and the binder and reactive materials consist of glutaric acid, the disodium or dipotassium salt of ethylenediaminetetraacetic acid, ascorbic acid and a blend of cellulase and mannanse enzymes.

14. A coating for application onto a wellbore screen comprising:

a chemical binder, at least one reactive material mixed with said chemical binder so that the reactive material is released from the binder when the binder and reactive material are inserted into a wellbore, and the reactive materials consist of sulfamic acid, the disodium or dipotassium salt of ethylenediaminetetraacetic acid, and ascorbic acid.

15. A coating for application onto a wellbore screen comprising:

a chemical binder, at least one reactive material mixed with said chemical binder so that the reactive material is released from the binder when the binder and reactive material are inserted into a wellbore, and the binder and reactive materials consist of polyglycolic acid or a copolymer of polyglycolic acid, the disodium or dipotassium salt of ethylenediaminetetraacetic acid and ascorbic acid.

* * * * *